United States Patent [19]

Kimura et al.

[11] 4,389,566
[45] Jun. 21, 1983

[54] AUTOMATIC FOCUSING APPARATUS FOR CAMERAS

[75] Inventors: Tadashi Kimura, Tokyo; Akihiko Hashimoto, Hachioji; Atsushi Kidawara, Tachikawa, all of Japan

[73] Assignee: Olympus Optical Co., Ltd., Tokyo, Japan

[21] Appl. No.: 282,875

[22] Filed: Jul. 13, 1981

Related U.S. Application Data

[63] Continuation of Ser. No. 41,336, May 22, 1979, abandoned.

[30] Foreign Application Priority Data

May 26, 1978 [JP] Japan ................................. 53-62926
May 26, 1978 [JP] Japan ................................. 53-62927

[51] Int. Cl.³ ............................................... G01J 1/20
[52] U.S. Cl. ............................. 250/204; 250/201; 354/25
[58] Field of Search ................. 250/204, 201, 558; 354/25 R; 356/4

[56] References Cited

U.S. PATENT DOCUMENTS 4,359,634 11/1982 Saito et al. ........................... 250/201

*Primary Examiner*—David C. Nelms
*Assistant Examiner*—Darwin R. Hostetter

[57] ABSTRACT

An automatic focusing apparatus for a camera comprises a first focusing optical system with a half mirror transmitting light from a subject, a second focusing optical system with a mirror to lead another light from the subject to the half mirror and a single focusing element for receiving said different lights thereby focusing detection.

7 Claims, 10 Drawing Figures

AUTOMATIC FOCUSING APPARATUS FOR CAMERAS

This is a continuation of application Ser. No. 041,336 filed May 22, 1979 abandoned.

BACKGROUND OF THE INVENTION

This invention relates to an automatic focusing apparatus for a camera capable of automatic focusing.

There have generally been developed automatic focusing apparatus in which a viewfinder for automatic control is incorporated in a range finder, and the shift of a mirror barrel is controlled for focusing in accordance with the detection signal of the finder. Using a plurality of focusing elements, such as photo diodes, such conventional focusing apparatus may be subject to errors in focusing detection attributable to variations, if any, of the characteristics of the elements. Therefore, the selection of the focusing elements would be a pretty hard task. In spite of such trouble, it is hardly possible to make the characteristics of all the elements entirely uniform, and the focusing capability obtained is not always satisfactory. Moreover, the use of such plurality of elements would complicate the construction of the apparatus and require a wider space therefor, leading, after all, to an increase in size and complication of the camera itelf.

SUMMARY OF THE INVENTION

Accordingly, the object of this invention is to provide an automatic focusing apparatus for a camera of simple construction capable of miniaturization, employing a single focusing element for higher-accuracy focusing detection.

DETAILED DESCRIPTION OF THE PREFERRED EMBODIMENTS

Figure 1:
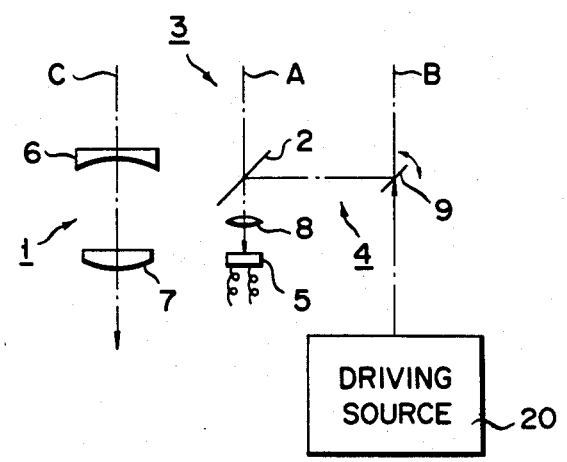
FIGS. 1 to 4 show optical systems of automatic focusing apparatus for cameras according to various embodiments of this invention.

Now there will be described automatic focusing apparatus according to several embodiments of the present invention with reference to the accompanying drawings.

The automatic focusing apparatus, shown in FIGS. 1 to 4 as separate illustrative embodiments, each comprise a finder optical system 1, a first focusing optical system 3 with a half mirror 2 transmitting light A from a subject to a predetermined imaging position, a second focusing optical system 4 for leading light B from the subject to the imaging position by reflecting it on the half mirror 2, and a single focusing element 5 for focusing detection at the imaging position.

The individual embodiments will be further described in detail as follows.

Referring first to the drawing of FIG. 1, the finder optical system 1, which is disposed in close vicinity to the optical systems for automatic focusing (first and second focusing optical systems), includes a concave lens 6 and a convex lens 7 as an ocular to receive light from the concave lens 6, both these lenses being on a common optical axis C. An imaging lens (convex lens) 8 is interposed between the half mirror 2 and the focusing element 5, while a rotatable mirror 9 to be swung as arrowed by a driving source 20 is disposed in the second focusing optical system 4 at a position in front of the half mirror 2.

The focusing detection with the focusing element 5 may be achieved by any suitable method, such as contrast detection, light quantity detection, etc. In this connection, focusing by the contrast detection method is performed as follows. An image by the direct light A and an image by the reflected light B from the rotatable mirror 9 are simultaneously formed on the element 5 by means of the imaging lens 8. If the rotatable mirror 9 is swung as arrowed, the image by the reflected light B is moved, and a portion at which the two images overlap each other comes to be in a more striking contrast than the remaining portion. Then, a focused state may be attained by adjusting the rotatable mirror 9 so as exactly to superimpose the two images seized by the contrast detection. In focusing by the light quantity detection method, on the other hand, the image by the direct light A is first formed on the element 5, and the light distribution on the element 5 is stored. Then, after a short interval, the image by the reflected light B or both images are thrown on the element 5, and the light distribution on the element 5 is measured. The focused state may be obtained by adjusting the rotatable mirror 9 so as to bring the two distribution values in line with each other.

Thus, application of the focusing detection by means of the single focusing element 5 will provide simplicity and compactness in structure of the apparatus, as well as a reduction in cost, without involving any detection error which may be attributed to varied capabilities of a plurality of elements incidental to the prior art apparatus.

Figure 2:
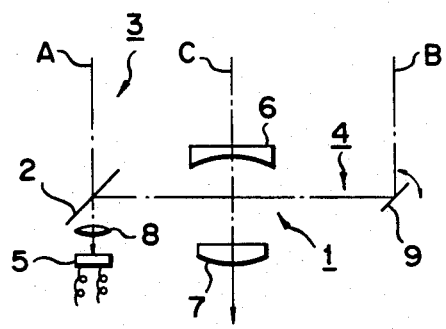

Referring now to FIG. 2, there will be described another embodiment of the invention. In this case, the half mirror 2 and the rotatable mirror 9 are disposed on both sides of the finder optical system 1, respectively, so that the light B from the rotatable mirror 9 to the half mirror 2 crosses the optical path C. Thus, the apparatus may enjoy additional compactness, as well as the same effects provided by the aforesaid embodiment. Like reference numerals refer to the same parts or components throughout the several drawings including FIGS. 1 and 2.

Figure 3:
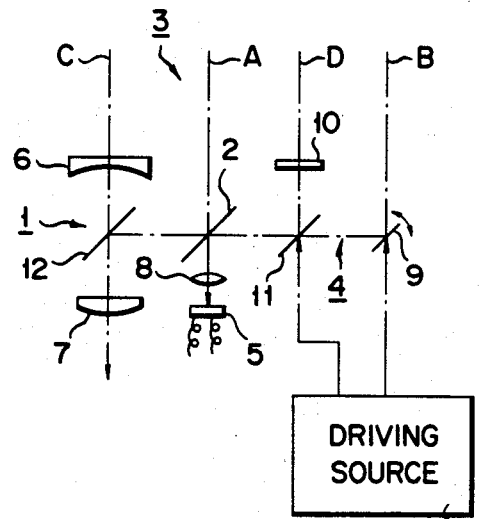
Figure 5:
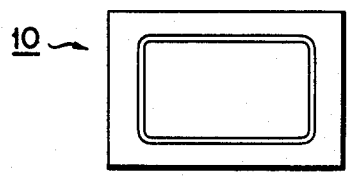
FIG. 5 is a plan of an optical frame pattern used with the optical systems of FIGS. 3 and 4.

In the embodiment of FIG. 3, an optical frame pattern 10 (planned in FIG. 5) and a mirror 11 interlocking with the rotatable mirror 9 by means of the driving source 20 are incorporated in the apparatus of FIG. 1, so that the short-distance parallax may be corrected. The mirror 11, having a central aperture, is interposed between the half mirror 2 and the rotatable mirror 9. Further, a half mirror 12 is disposed between the concave and convex lenses 6 and 7 in the finder optical system 1.

Light D transmitted through the optical frame pattern 10 is reflected on the mirror 11, transmitted through the half mirror 2, and reflected on the half mirror 12 to reach the convex lens 7 or ocular portion. The finder visibility generally ranges from −0.5 D to −1.5 D, and the image of the optical frame pattern 10 is superposed on the visibility. The reflected light B from the rotatable mirror 9 is transmitted through the central aperture of the mirror 11 to reach the half mirror 2, on which it is again reflected to get to the focusing element 5. By swingingly adjusting the rotatable mirror 9 as arrowed, the short-distance parallax is corrected at the ocular portion by means of the mirror 11 inter-locking with the rotatable mirror 9.

Figure 4:
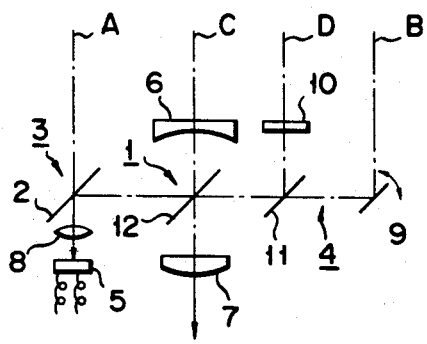

Referring now to the embodiment of FIG. 4, the optical pattern 10 and the mirror 11 interlocking with the rotatable mirror 9 are incorporated in the apparatus of FIG. 2, so that the short-distance parallax may be automatically corrected. The half mirror 12 is disposed between the concave and convex lenses 6 and 7 in the finder optical system 1 so that the image of the optical frame pattern 10 may be reflected on the half mirror 12 to be led to the ocular portion.

Thus, the automatic focusing apparatus of the present invention can achieve high-accuracy focusing detection by means of the single focusing element, providing simple and compact structure.

In the embodiments of FIGS. 2 and 4, the second focusing optical system 4 and the finder optical system 1 are in such a positional relationship that their optical paths cross each other. Accordingly, the apparatus and hence the camera itself can be made further compact or small-sized.

Referring now to the drawings of FIGS. 6 and 7, there will be described additional embodiments of the invention.

Figure 6:
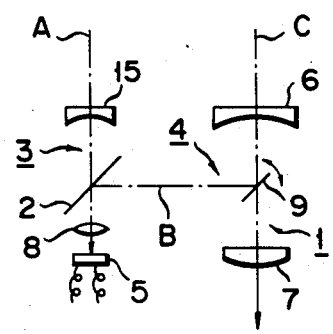
FIGS. 6 and 7 show optical systems of automatic focusing apparatus according to further different embodiments of the invention.
Figure 7:
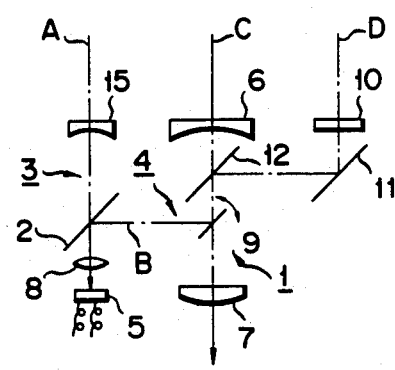

The automatic focusing apparatus of these embodiments, as shown in FIGS. 6 and 7, each comprises the finder optical system 1, first focusing optical system 3 for transmitting the light A from the subject through the half mirror 2 to the predetermined imaging position, second focusing optical system 4 again reflecting on the first half mirror 2 the reflected light B from the second half mirror 9 capable of angle adjustment, which is interposed in the finder optical system 1, to lead the reflected light B to the imaging position, and the single focusing element 5.

In the embodiment of FIG. 6, the finder optical system 1 includes the objective (concave lens) 6 and ocular (convex lens) 7. The imaging lens (convex lens) 8 is interposed between the half mirror 2 and the focusing element 5. Further, a concave lens 15 on the same optical axis with the imaging lens 8, as part of the first focusing optical system, is disposed in front of the first half mirror 2.

Like the case of the aforementioned embodiments, the focusing detection with the focusing element 5 may be achieved by any known method, such as contrast detection, light quantity detection, etc.

Figure 9:
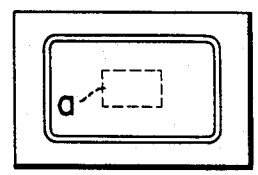
FIGS. 9 and 10 show varied states of an image viewed through a finder with the optical system of FIG. 7.

In the apparatus of the FIGS. 6 and 7 the half mirror 9 may be visually noticed as a dim image a, as shown in FIG. 9, through the finder, so that a photographer can be aware of the present distance range while looking in at the finder.

Figure 8:
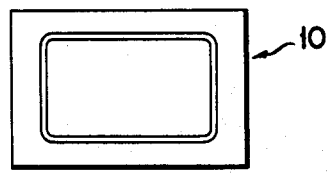
FIG. 8 is a plan of an optical frame pattern used with the optical system of FIG. 7.

In the embodiment of FIG. 7, the optical frame pattern 10 (planned in FIG. 8) is incorporated in the apparatus of FIG. 6 so that the short-distance parallax may be automatically corrected. The third half mirror 12 is interposed between the second half mirror 9 and the objective 6. The light D transmitted through the optical frame pattern 10 is reflected on the mirror 11 behind the pattern 10 to be led to the third half mirror 12, where it is again reflected to be led to the ocular portion of the finder.

Thus, the light D transmitted through the optical frame pattern 10 reaches the ocular portion via the mirrors 11 and 12. Further, the optical path C of the finder reaches the ocular portion through the half mirrors 12 and 9. While the finder visibility generally ranges from −0.5 D to −1.5 D, the image of the optical frame pattern 10 is superposed on the visibility. Moreover, the reflected light B from the half mirror 9 in the finder optical path C reaches the focusing element 5, and the focusing detection may be achieved by adjusting the mirror 9, whereby the short-distance parallax may simultaneously be corrected at the finder ocular portion.

Figure 10:
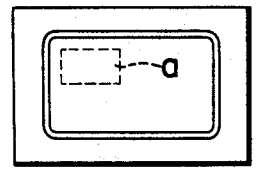

In both embodiments of FIGS. 6 and 7, the distance range may be adjusted to an optional position within the field of view of the finder, as shown in FIG. 10 for example, by shifting the position of the half mirror 9.

What we claim is:

1. An automatic focus detection apparatus for a camera, comprising a first focusing optical system including a first half mirror transmitting light from a subject to a predetermined imaging position, a second focusing optical system including a second mirror leading light from the subject to said half mirror to be reflected on said half mirror to be led to said imaging position, at least one of said first and second mirrors being capable of moving to change the angle of reflection thereof, and a single focus detection element disposed in said imaging position to detect focusing by means of the lights from both said mirrors.

2. An apparatus according to claim 1 further comprising a finder optical system directly receiving the light from the subject.

3. An apparatus according to claim 2, wherein said finder optical system has an optical axis crossing an optical axis from said second mirror to first mirror.

4. An apparatus according to claim 2 further comprising an optical frame pattern and a third mirror for leading a light transmitted through said optical frame pattern to said finder optical system, wherein said finder optical system includes a fourth half mirror transmitting the light from the subject and reflecting the light from said third mirror in the direction of said transmission.

5. An apparatus according to claim 3 further comprising an optical frame pattern and a third mirror for leading a light transmitted through said optical frame pattern to said finder optical system, wherein said finder optical system includes a fourth half mirror transmitting the light from the subject and reflecting the light from said third mirror in the direction of said transmission.

6. An apparatus according to claim 1, wherein said second focusing optical system includes a half mirror constituting said second mirror and ocular to receive a transmitted light from said half mirror, and serves also as a finder optical system.

7. An apparatus according to claim 6 wherein said second focusing optical system includes a third half mirror for transmitting the light from the subject to said second mirror, said apparatus further comprising an optical frame pattern and a fourth mirror for leading a light transmitted through said optical frame pattern to said half mirror, so that said light may be reflected on said third half mirror in the same direction with the light transmitted through said third half mirror.

* * * * *